(12) United States Patent
Madey et al.

(10) Patent No.: US 10,178,525 B2
(45) Date of Patent: Jan. 8, 2019

(54) CONTEXT-BASED DYNAMIC POLICY SYSTEM FOR MOBILE DEVICES AND SUPPORTING NETWORK INFRASTRUCTURE

(75) Inventors: Daniel A. Madey, Crownsville, MD (US); Dennis V. Pollutro, Clymer, NY (US); Guy Levy-Yurista, Rockville, MD (US)

(73) Assignee: INPIXON, Palo Alto, CA (US)

( * ) Notice: Subject to any disclaimer, the term of this patent is extended or adjusted under 35 U.S.C. 154(b) by 426 days.

(21) Appl. No.: 13/294,794

(22) Filed: Nov. 11, 2011

(65) Prior Publication Data

US 2012/0131155 A1 May 24, 2012

Related U.S. Application Data

(60) Provisional application No. 61/413,407, filed on Nov. 13, 2010, provisional application No. 61/413,406, filed on Nov. 13, 2010, provisional application No. 61/413,402, filed on Nov. 13, 2010, provisional application No. 61/431,680, filed on Jan. 11, 2011, provisional application No. 61/431,673, filed on Jan. 11, 2011, provisional application No. 61/437,195,
(Continued)

(51) Int. Cl.
*H04W 4/50* (2018.01)
*H04W 4/00* (2018.01)
*H04W 4/02* (2018.01)

(52) U.S. Cl.
CPC .............. *H04W 4/50* (2018.02); *H04W 4/001* (2013.01); *H04W 4/02* (2013.01); *H04W 4/027* (2013.01)

(58) Field of Classification Search
CPC ....... H04W 4/001; H04W 4/02; H04W 4/027; H04L 67/18; H04L 67/34; H04L 67/327

USPC .......................................................... 709/220
See application file for complete search history.

(56) References Cited

U.S. PATENT DOCUMENTS 7,774,402 B2 * 8/2010 Singh .................. H04L 63/0263
709/201
2004/0253963 A1 * 12/2004 Park ...................... H04M 3/436
455/456.2
(Continued)

FOREIGN PATENT DOCUMENTS

WO WO-2012065101 A1 5/2012

OTHER PUBLICATIONS

"European Application Serial No. 11839712.4, Office Action dated Jun. 26, 2013", 2 pgs.
(Continued)

*Primary Examiner* — Vivek Srivastava
*Assistant Examiner* — Sibte H Bukhari
(74) *Attorney, Agent, or Firm* — Pillsbury Winthrop Shaw Pittman LLP

(57) ABSTRACT

Systems and methods dynamically adapt network policies for mobile devices by accessing context-based values to allocate or restrict capabilities on the mobile devices or within the network. Context-based values may include position or velocity as well as more general environment features such as proximity of other devices, the presence or absence of other wireless signals or network traffic, parameters measured by local or remote sensors, user credentials, or unique user or signal inputs to the device. Relevant capabilities may include access to hardware and software interfaces and related parameter sets including priority settings.

38 Claims, 11 Drawing Sheets

Related U.S. Application Data filed on Jan. 28, 2011, provisional application No. 61/452,285, filed on Mar. 14, 2011.

(56) References Cited

U.S. PATENT DOCUMENTS

| | | | |
|---|---|---|---|
| 2006/0121894 A1* | 6/2006 | Ganesan | H04W 36/14 455/432.1 |
| 2007/0022380 A1* | 1/2007 | Swartz et al. | 715/733 |
| 2007/0066318 A1* | 3/2007 | Danzeisen et al. | 455/450 |
| 2008/0098062 A1* | 4/2008 | Balia | G06F 17/30867 709/203 |
| 2008/0299954 A1* | 12/2008 | Wright et al. | 455/414.1 |
| 2009/0049518 A1* | 2/2009 | Roman | H04L 41/0893 726/1 |
| 2009/0083768 A1 | 3/2009 | Hatalkar et al. | |
| 2009/0224867 A1 | 9/2009 | O'Shaughnessy et al. | |
| 2009/0258649 A1* | 10/2009 | Salowey | H04W 4/02 455/435.2 |
| 2010/0284290 A1 | 11/2010 | Williams | |
| 2010/0317336 A1* | 12/2010 | Ferren et al. | 455/419 |
| 2011/0060754 A1* | 3/2011 | Theimer et al. | 707/769 |
| 2011/0126119 A1* | 5/2011 | Young | G06F 3/048 715/744 |
| 2011/0126259 A1* | 5/2011 | Krishnamurthi | H04L 43/026 726/1 |
| 2011/0143811 A1* | 6/2011 | Rodriguez | 455/556.1 |
| 2011/0177802 A1* | 7/2011 | Gupta | 455/418 |
| 2012/0131044 A1* | 5/2012 | Nusser et al. | 707/769 |
| 2012/0271913 A1* | 10/2012 | Tallgren et al. | 709/217 |
| 2013/0298244 A1* | 11/2013 | Kumar | G06F 21/52 726/25 |

OTHER PUBLICATIONS

"International Application Serial No. PCT/US2011/060431, International Preliminary Report on Patentability dated May 23, 2013", 10 pgs.

"International Application Serial No. PCT/US2011/060431, International Search Report dated Feb. 21, 2012", 2 pgs.

"International Application Serial No. PCT/US2011/060431, Written Opinion dated Feb. 21, 2012", 8 pgs.

Office Action for Related Canadian Application No. 2817738 dated Aug. 24, 2018, pp. 1 to 4.

\* cited by examiner

DYNAMIC POLICY MATRIX FOR A GROUP OF MOBILE DEVICES

| LOCATION / VELOCITY OF MOBILE DEVICES | MICRO-PHONE | WIFI | CAMERA | BLUETOOTH | SECURITY SETTINGS | CELL / WIFI NETWORKS ALLOWED | PHONE NUMBERS ALLOWED | SW APPLICATIONS ALLOWED |
|---|---|---|---|---|---|---|---|---|
| LOCATION 1 (HIGHLY TRUSTED SITE) | NO | NO | NO | NO | MODERATE | SET A | ONLY EMERGENCY SET | SET 1 |
| LOCATION 2 (TRUSTED LOCATION) | YES | NO | NO | NO | MODERATE | SET B | $N_1-N_{20}$ | SET 2 |
| LOCATION 3 (OFF CAMPUS) | YES | YES | YES | YES | HIGH | SET C | ANY | SET 3 |
| LOCATION 4 (OVERSEAS) | YES | YES | YES | NO | HIGH | SET X | $N_1-N_{22}$ | SET 10 |

FIG. 3

DYNAMIC POLICY MATRIX FOR NETWORK INFRASTRUCTURE
SUPPORTING A GROUP OF MOBILE DEVICES

| LOCATION / VELOCITY OF MOBILE DEVICES | QUALITY OF SERVICE / PRIORITY | NETWORK ACCESS CONTROL SETTINGS | PROXY SETTINGS | AUTHENTICATION REQUIRED | INTRUSION DETECTION / PREVENTION SETTINGS | ACCESSIBLE NETWORKS / SERVERS / DIRECTORIES |
|---|---|---|---|---|---|---|
| LOCATION 1 (HIGHLY TRUSTED SITE) | HIGH | LIBERAL | YES | 1 FACTOR | LIBERAL | SET 1, SET 2, SET 3 |
| LOCATION 2 (TRUSTED LOCATION) | HIGH | LIBERAL | YES | 1 FACTOR | LIBERAL | SET 2, SET 3 |
| LOCATION 3 (OFF CAMPUS) | MEDIUM | STRICT | NONE | 2 FACTOR | STRICT | SET 3 |
| LOCATION 4 (OVERSEAS) | MEDIUM | VERY STRICT | NONE | 3 FACTOR | VERY STRICT | NONE |

FIG. 7

CONTEXT-BASED DYNAMIC POLICY SYSTEM FOR MOBILE DEVICES AND SUPPORTING NETWORK INFRASTRUCTURE

CROSS-REFERENCE TO RELATED APPLICATIONS

This application claims the priority benefit of U.S. Provisional Application No. 61/413,402, filed Nov. 13, 2010, U.S. Provisional Application No. 61/413,406, filed Nov. 13, 2010, U.S. Provisional Application No. 61/413,407, filed Nov. 13, 2010, U.S. Provisional Application No. 61/431,673, filed Jan. 11, 2011, U.S. Provisional Application No. 61/431,680, filed Jan. 11, 2011, U.S. Provisional Application No. 61/437,195, filed Jan. 28, 2011, and U.S. Provisional Application No. 61/452,285, filed Mar. 14, 2011, each of which is incorporated herein by reference in its entirety.

BACKGROUND

Technical Field

The present disclosure relates generally to communications networks and more particularly to communications networks that include mobile devices.

Description of Related Art

Communications networks must increasingly accommodate mobile devices whose changing coordinates may frustrate the goals of static network policies for managing system resources. Thus, there is a need for communications networks where system resources and policies can dynamically adapt to mobile devices.

SUMMARY

Certain embodiments provide systems and methods that dynamically adapt network policies for mobile devices by accessing context-based values that may include position or velocity to allocate or restrict capabilities on the mobile devices or within the network.

One embodiment relates to a method of providing a method of selecting a first network policy for a mobile device that operates as an endpoint in a communications network. The method includes storing network policy values for the mobile device in a storage system, where the network policy values relating context-based values for the mobile device to operational features for the mobile device. The method further includes receiving first context-based values for the mobile device from at least one context-based data source. The method further includes using the first context-based values to select the first network policy for the mobile device from the stored network policy values, where the first network policy specifies first operational features for the mobile device. The method further includes sending endpoint configuration values for the first network policy to an endpoint policy management unit to enforce the first network policy at the mobile device.

The context-based values for the mobile device may include at least one of position or velocity for the mobile device. The operational features for the mobile device may include at least one enabled component or disabled component at the mobile device. The at least one context-based data source may include a position or velocity sensor for the mobile device.

Selecting the first network policy may include accessing a dynamic policy function that relates the first context-based values to an enablement or disablement status for one or more hardware or software elements at the mobile device.

The endpoint policy management unit may send instructions corresponding to the first network policy to a mobile-device control unit that controls software and hardware operations at the mobile device.

The context-based values for the mobile device may include at least one performance characteristic within the mobile device or within network infrastructure that supports operations of the mobile device in the communications network.

The operational features for the mobile device may include at least one enabled function or disabled function within the mobile device or within network infrastructure that supports operations of the mobile device in the communications network.

The at least one context-based data source may include at least one performance measurement device within the mobile device or within network infrastructure that supports operations of the mobile device in the communications network.

The operational features for the mobile device may include an enablement or disablement for at least one function of network infrastructure that supports operations of the mobile device in the communications network, and the method may further include: sending network-infrastructure configuration values for the first network policy to a network infrastructure policy management unit to enforce the first network policy at the network infrastructure. Additionally, the network-infrastructure policy-management unit may send instructions corresponding to the first network policy to a network control unit that controls software and hardware operations at the network infrastructure.

Another embodiment relates to a method of implementing a network policy for a mobile device that operates as an endpoint in a communications network. The method includes receiving context-based values for the mobile device from at least one context-based data source. The method further includes sending the context-based values to a dynamic policy unit that determines network policies related to the mobile device from the context-based values. The method further includes receiving values for a network policy from the dynamic policy unit. The method further includes sending instructions to a control unit that enforces the network policy for at least a portion of the communications network.

The method may further include logging events including the context-based values and the network policy values in a storage system. The method may further include autonomously revising the network policy on the mobile device or within the network infrastructure based on the received context-based values.

The at least one context-based data source may be included in the mobile device, and the control unit may be a mobile-device control unit that controls at least some hardware or software of the mobile device.

The at least one context-based data source may be included in network infrastructure that supports operations of the mobile device in the communications network, and the control unit may be a network infrastructure control unit that controls at least some hardware or software of the network infrastructure.

Another embodiment relates to a computer-readable medium that stores (e.g., tangibly embodies) a computer program for carrying out the any one of the above-described methods with a computer. At least some values for the results of the method can be saved for later use in a computer-readable medium, including memory units and storage devices.

Another embodiment relates to an apparatus for carrying out any one of the above-described methods, where the apparatus includes a computer for executing instructions related to the method. For example, the computer may include a processor for executing at least some of the instructions. Additionally or alternatively the computer may include circuitry or other specialized hardware for executing at least some of the instructions. In some operational settings, the apparatus may be configured as a system that includes one or more units, each of which is configured to carry out some aspects of the method either in software, in hardware or in some combination thereof.

For example, another embodiment relates to an apparatus for selecting a first network policy for a mobile device that operates as an endpoint in a communications network, the apparatus comprising at least one computer to perform operations for a policy-storage module, a value-receiving module, a policy-selection module, and a value-sending module. The policy-storage module stores network policy values for the mobile device in a storage system, the network policy values relating context-based values for the mobile device to operational features for the mobile device. The value-receiving module receives first context-based values for the mobile device from at least one context-based data source. The policy-selection module uses the first context-based values to select the first network policy for the mobile device from the stored network policy values, the first network policy specifying first operational features for the mobile device. The value-sending module that sends endpoint values for the first network policy to an endpoint policy management unit to enforce the first network policy at the mobile device.

Another embodiment relates to an apparatus for implementing a network policy for a mobile device that operates as an endpoint in a communications network, the apparatus comprising at least one computer to perform operations for a data-retrieval module, and a dynamic-policy-enforcement module. The data-retrieval module receives context-based values for the mobile device from at least one context-based data source and sends the context-based values to a dynamic policy unit that determines network policies related to the mobile device from the context-based values. The dynamic-policy-enforcement module receives values for a network policy from the dynamic policy unit and sends instructions to a control unit that enforces the network policy for at least a portion of the communications network. The apparatus may further include an event-logging module that logs events including the context-based values and the network policy values in a storage system or an autonomous-configuration module that autonomously revises the network policy based on the received context-based values.

In these ways, aspects of the disclosed embodiments enable communications networks where system resources and policies can dynamically adapt to mobile devices.

BRIEF DESCRIPTION OF THE DRAWINGS

FIG. 3 is a matrix that shows dynamic policies for mobile devices in the embodiment of FIG. 1.

FIG. 7 is a matrix that shows dynamic policies for network infrastructure in the embodiment of FIG. 5.

DETAILED DESCRIPTION OF EXAMPLE EMBODIMENTS

Figure 1:
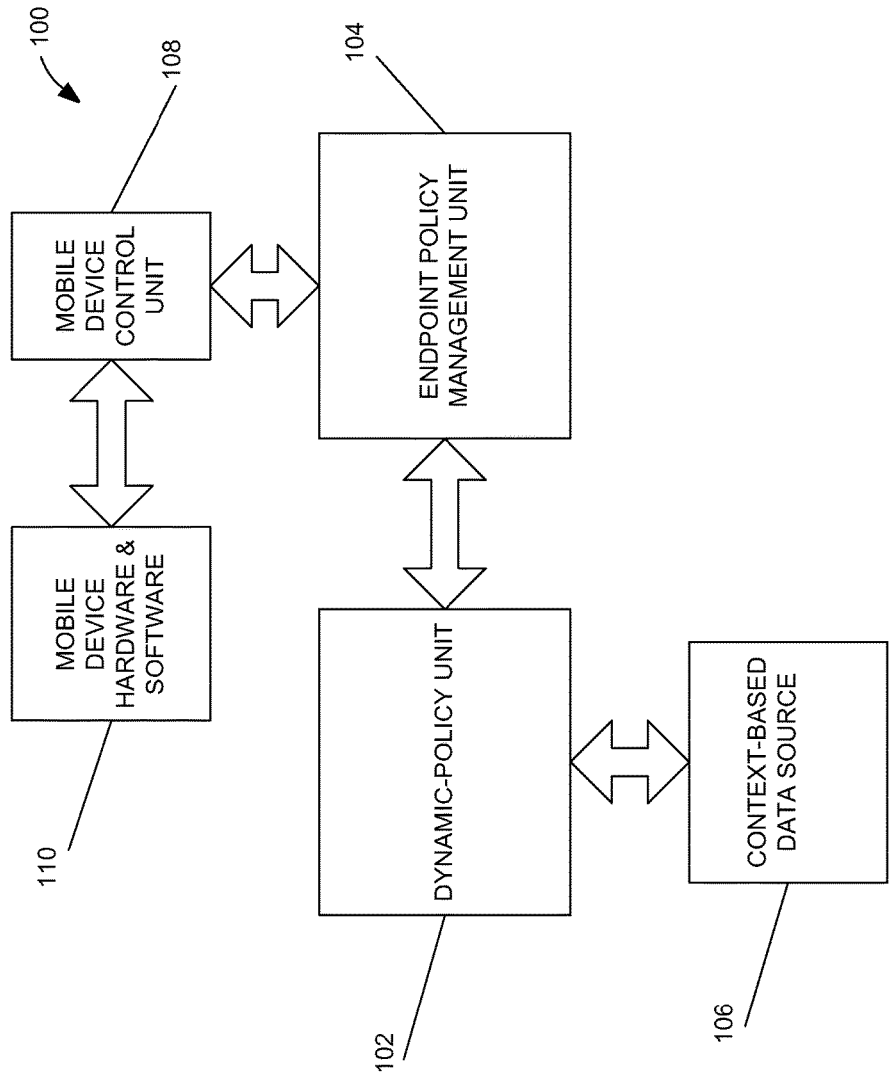
FIG. 1 is a block diagram that shows a communications network for an example embodiment.

FIG. 1 is a block diagram that shows a communications network 100 for an example embodiment. As discussed below in greater detail, a dynamic-policy unit 102 selects a network policy for a mobile device and communicates that policy to an endpoint policy-management unit 104. The dynamic-policy unit 102 receives context-based data from context-based data sources 106, which may include sensors at the mobile device. The endpoint policy-management unit 104 sends commands to enforce the network policy to a mobile-device control unit 108 that controls mobile-device hardware and software 110.

Mobile devices typically include cellular telephones, smart phones, tablets, laptops, portable computers, and other portable electronic devices and appliances. Context-based values typically include position or velocity for the mobile device. Context-based values may also include environmental factors such as proximity of other devices, the presence or absence of other wireless signals or network traffic, parameters measured by local or remote sensors, user credentials, or unique user or signal inputs to the device. Context-based values may also include state variables defined within an enterprise such as threat level, network state, or operational state.

Figure 2:
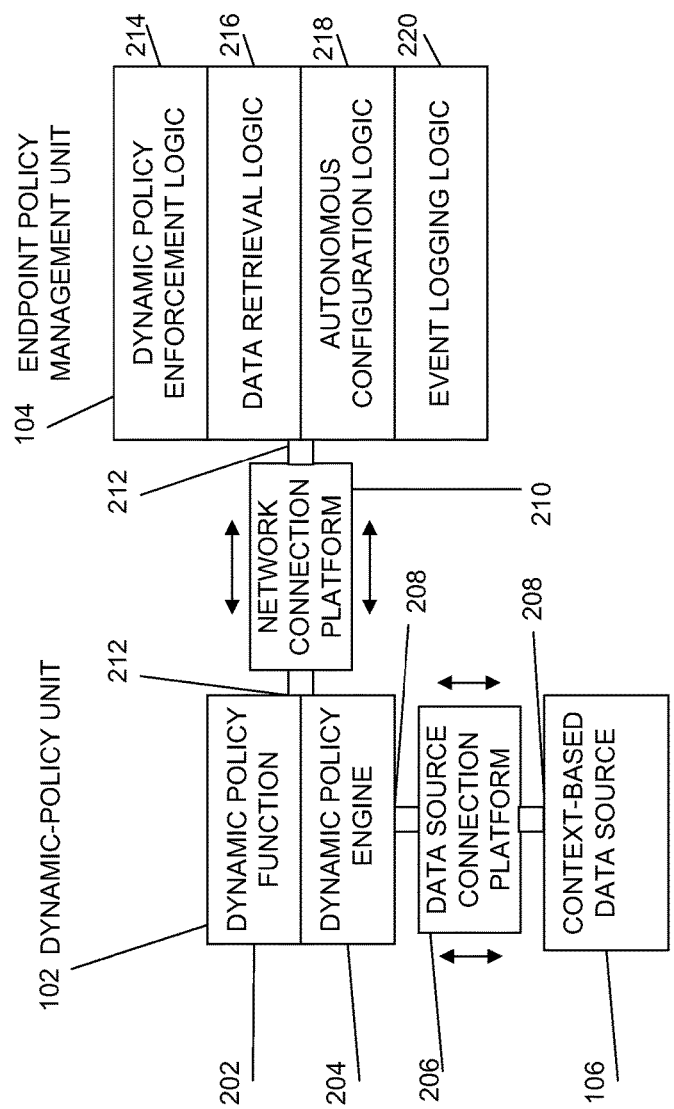
FIG. 2 is a block diagram that shows further details related to the embodiment of FIG. 1.

FIG. 2 is a block diagram that shows further details related to the embodiment of FIG. 1. The dynamic-policy unit 102 includes a dynamic-policy function 202 and a dynamic-policy engine 204. The dynamic-policy function 202 accesses dynamic policies based on available context-based data. The dynamic policy engine 204 accesses context-based data from the context-based data sources 106 through a data-source connection platform 206 with data-source platform connectors 208 and applies the dynamic policy function 202 to determine a network policy for the mobile device. The dynamic-policy unit 102 communicates with the endpoint policy-management unit 104 through a network connection platform 210 with network connectors 212. The endpoint policy-management unit 104 includes dynamic-policy enforcement logic 214, and optionally data-retrieval logic 216, autonomous configuration logic 218, and event-logging logic 220.

The data-source connection platform 206 may be a Mobile Device Management (MDM) platform, a Mobile Service Management (MSM) platform, or an Endpoint Management Platform (EMP), each of which gives system administrators a centralized platform for the management of groups of mobile devices. The data-source connection platform 206 may be a Network Management Platform (NMP), which gives system administrators a centralized interface for managing and configuring network appliances and logic.

FIG. 3 is a matrix that shows dynamic policies for mobile devices in the embodiment of FIG. 1. The first column shows characteristics of the position and velocity of a mobile device including "highly trusted site," "trusted location," "off campus," and "overseas." The second through ninth columns show polices including enablement and disablement for hardware and software capabilities including microphone, WiFi, camera, Bluetooth, security settings, cell/WiFi networks allowed, phone numbers allowed, and software (SW) applications allowed. Other possible capabilities include access to hardware and software interfaces and related parameter sets including priority settings.

Figure 4:
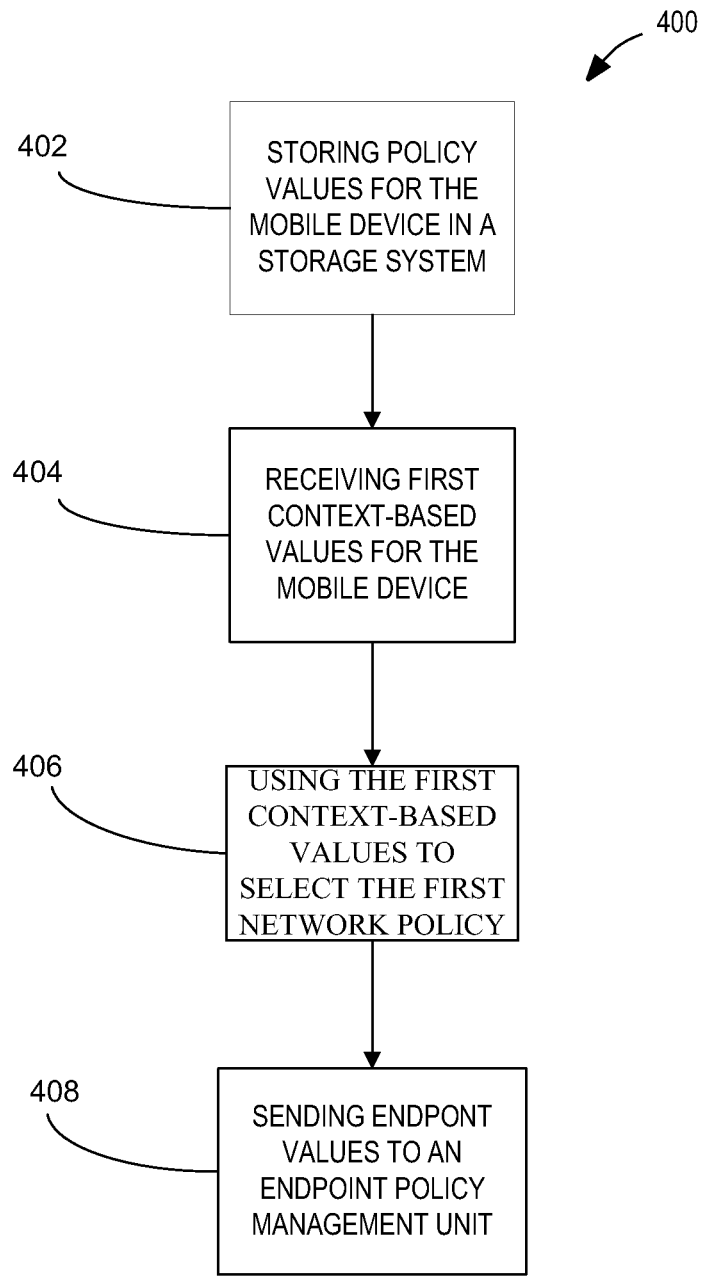
FIG. 4 is a flowchart that shows a method of selecting a network policy for the embodiment of FIG. 1.

FIG. 4 is a flowchart that shows a method 400 of selecting a network policy for a mobile device that operates as an endpoint in a communications network in the embodiment of FIG. 1. A first block 402 includes storing network policy values for the mobile device in a storage system, where the network policy values relate context-based values for the mobile device to operational features for the mobile device. A second block 404 includes receiving first context-based values for the mobile device from at least one context-based data source. A third block 406 includes using the first context-based values to select the first network policy for the mobile device from the stored network policy values, where the first network policy specifies first operational features for the mobile device. A fourth block 408 includes sending endpoint values for the first network policy to an endpoint policy management unit to enforce the first network policy at the mobile device.

Note that the word first is used here and elsewhere for labeling purposes only and are not intended to denote any specific spatial or temporal ordering. Furthermore, the labeling of a first element does not imply the presence a second element.

The context-based values for the mobile device may include at least one of position or velocity for the mobile device. The operational features for the mobile device may include at least one enabled component or disabled component at the mobile device. The at least one context-based data source may include a position or velocity sensor for the mobile device.

Selecting the first network policy may include accessing a dynamic policy function that relates the first context-based values to an enablement or disablement status for one or more hardware or software elements at the mobile device.

The endpoint policy management unit may send instructions corresponding to the first network policy to a mobile-device control unit that controls software and hardware operations at the mobile device.

In addition to the operations at the mobile device, a network policy may affect operations at related network infrastructure, which typically includes servers, routers, and various support systems. These support systems may include functions for access control, authentication, quality of service, proxy services, load balancing, firewalls, security, encryption, and additional system functions.

Figure 5:
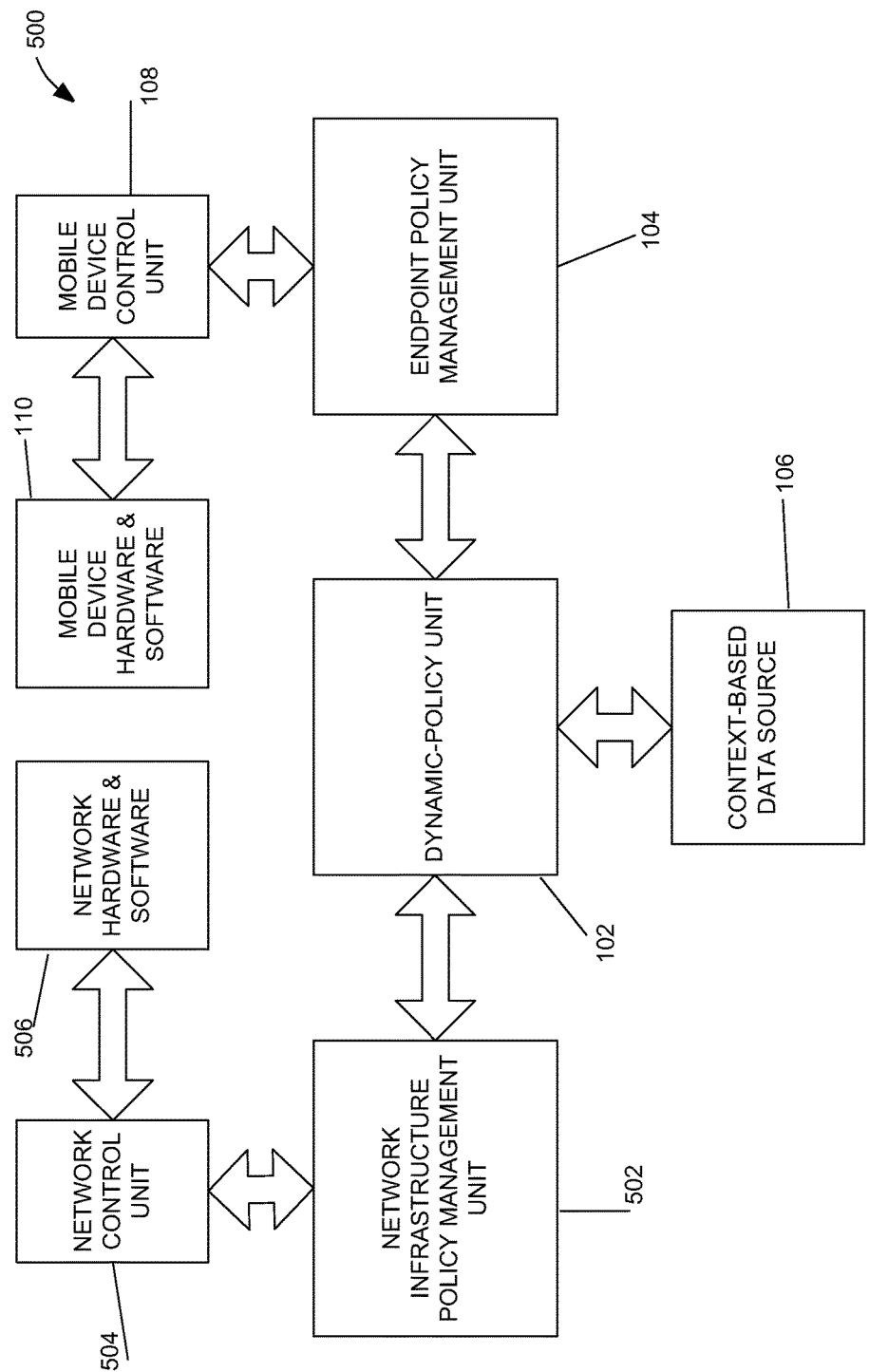
FIG. 5 is a block diagram that shows another communications network for an example embodiment.

FIG. 5 is a block diagram that shows another communications network 500 for an example embodiment where the embodiment of FIG. 1 is extended to include network infrastructure that supports operations of the mobile device in the communications network. As in FIG. 1, the communications network 500 includes a dynamic-policy unit 102 that selects a network policy for a mobile device and communicates that policy to an endpoint policy-management unit 104. Additionally as in FIG. 1, the endpoint policy-management unit 104 sends commands to enforce the network policy to a mobile-device control unit 108 that controls mobile-device hardware and software 110.

In this embodiment the dynamic-policy unit 102 receives context-based data from context-based data sources 106, which may include sensors at the mobile device and the network infrastructure. The dynamic-policy unit 102 selects a network policy for network infrastructure that supports operations of the mobile device and communicates that policy to a network-infrastructure policy-management unit 502. The network-infrastructure policy-management unit 502 sends commands to enforce the network policy to a network control unit 504 that controls network hardware and software 506.

Figure 6:
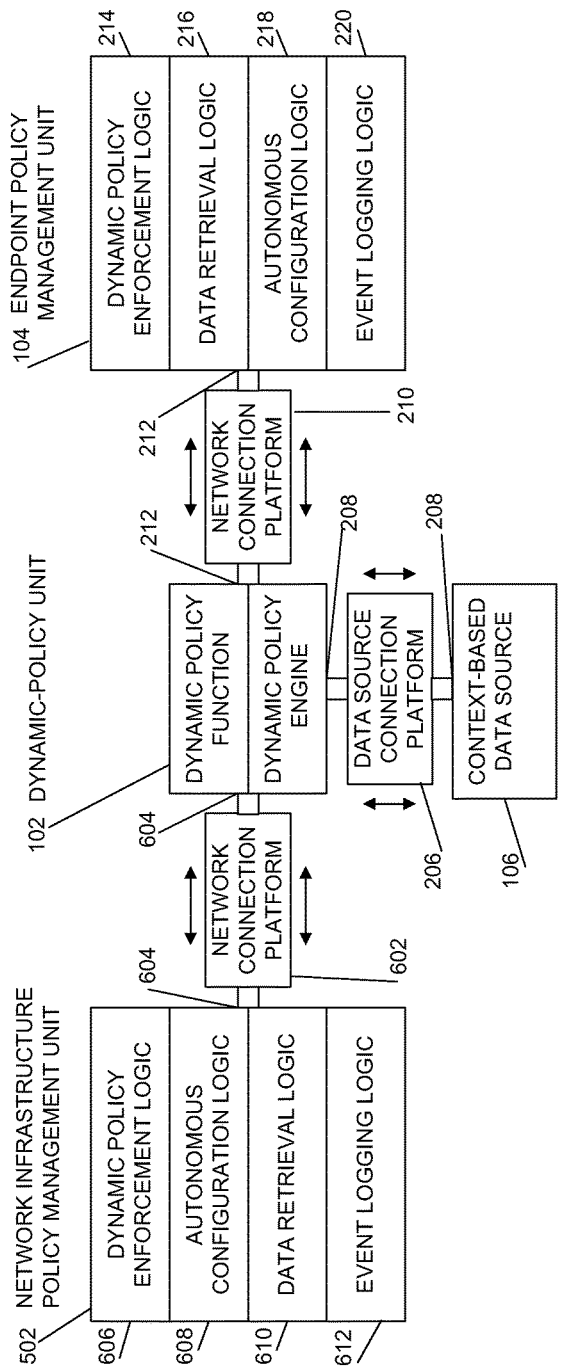
FIG. 6 is a block diagram that shows further details related to the embodiment of FIG. 5.

FIG. 6 is a block diagram that shows further details related to the embodiment of FIG. 5, where the embodiment of FIG. 2 is extended to include network infrastructure that supports operations of the mobile device in the communications network. As in FIG. 2, the dynamic-policy unit 102 includes a dynamic-policy function 202 and a dynamic-policy engine 204. The dynamic-policy function 202 accesses dynamic policies based on available context-based data. The dynamic policy engine 204 accesses context-based data from the context-based data sources 106 through a data-source connection platform 206 with data-source platform connectors 208 and applies the dynamic policy function 202 to determine a network policy for the mobile device. The dynamic-policy unit 102 communicates with the endpoint policy-management unit 104 through a network connection platform 210 with network connectors 212. The endpoint policy-management unit 104 includes dynamic-policy enforcement logic 214, and optionally data-retrieval logic 216, autonomous configuration logic 218, and event-logging logic 220.

In FIG. 6, the dynamic policy engine 204 additionally accesses context-based data from the context-based data sources 106 and applies the dynamic policy function 202 to determine a network policy for the network infrastructure that supports operations of the mobile device in the communications network. The dynamic-policy unit 102 communicates with the network-infrastructure policy-management unit 502 through a network connection platform 602 with network connectors 604. The network-infrastructure policy-management unit 502 includes dynamic-policy enforcement logic 606, and optionally data-retrieval logic 608, autonomous configuration logic 610 and event-logging logic 612.

FIG. 7 is a matrix that shows dynamic policies for network infrastructure in the embodiment of FIG. 5. The first column shows characteristics of the position and velocity of a mobile device including "highly trusted site," "trusted location," "off campus," and "overseas." The second through seventh columns show polices including enablement and disablement for functional capabilities including quality of service and priority, network access control settings, proxy settings, authentication requirements, intrusion detection and prevention setting, and accessible networks, servers and directories. Other possible capabilities include access to hardware and software interfaces and related parameter sets including priority settings.

Figure 8:
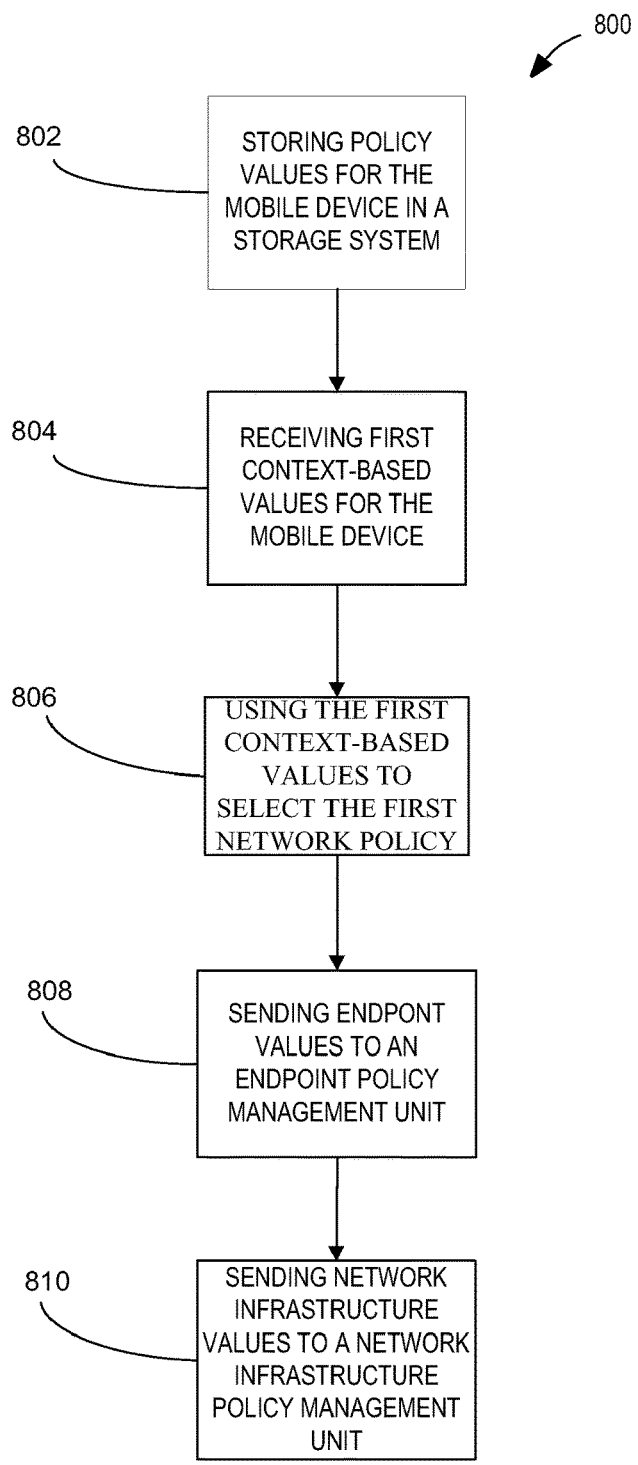
FIG. 8 is a flowchart that shows a method of selecting a network policy for the embodiment of FIG. 5.

FIG. 8 is a flowchart that shows a method 800 of selecting a network policy for a mobile device that operates as an endpoint in a communications network in the embodiment of FIG. 5. The method 800 extends the embodiment of FIG. 4 to include policy management of related network infrastructure. As in FIG. 5, a first block 402 includes storing network policy values for the mobile device in a storage system, where the network policy values relate context-based values for the mobile device to operational features for the mobile device. A second block 404 includes receiving first context-based values for the mobile device from at least one context-based data source. A third block 406 includes using the first context-based values to select the first network policy for the mobile device from the stored network policy values, where the first network policy specifies first operational features for the mobile device. A fourth block 408 includes sending endpoint values for the first network policy to an endpoint policy management unit to enforce the first network policy at the mobile device. In this embodiment a fifth block 802 includes sending network-infrastructure values for the first network policy to a network-infrastructure policy management unit to enforce the first network policy at the network infrastructure.

Figure 9:
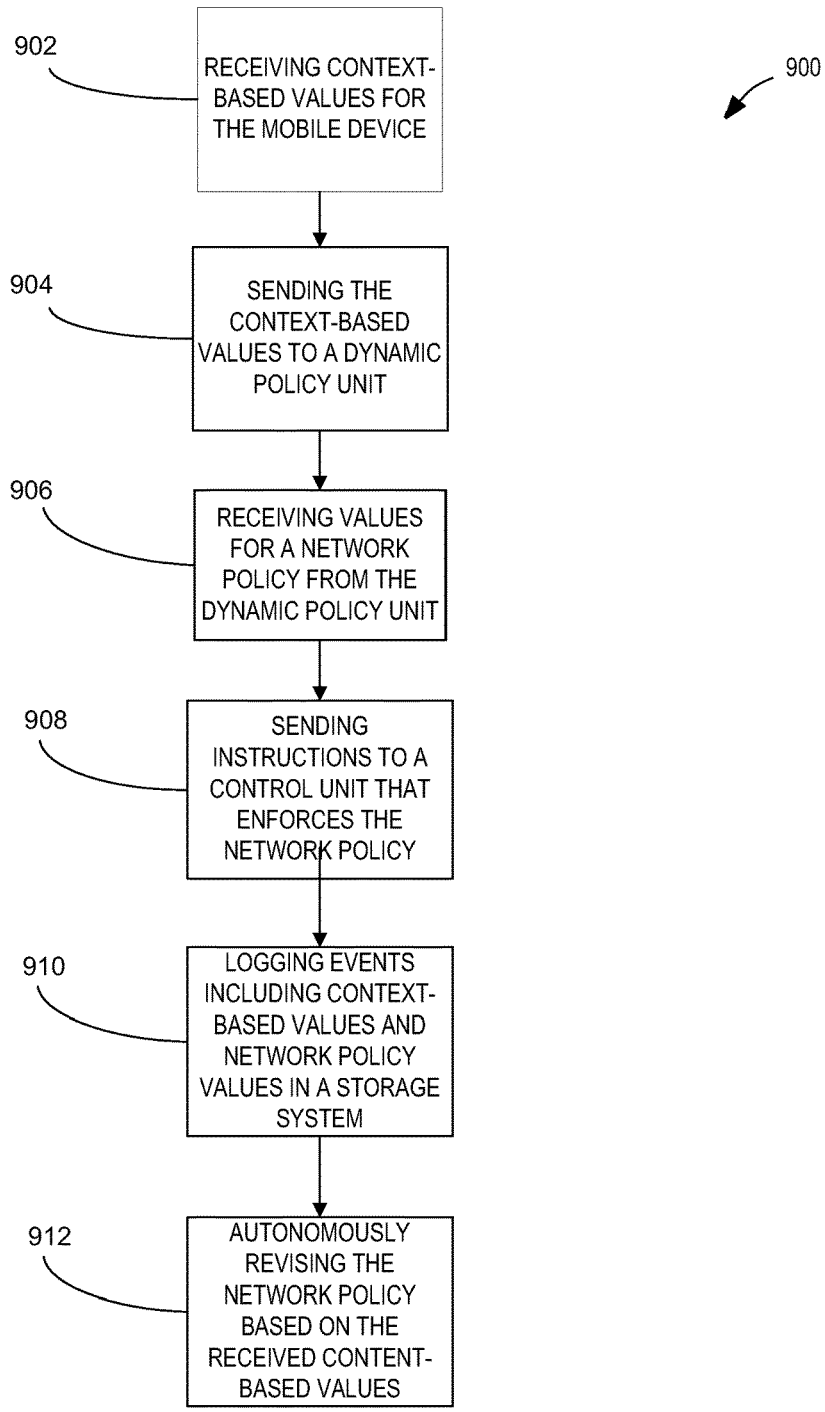
FIG. 9 is a flowchart that shows a method of implementing a network policy for the embodiments of FIG. 1 and FIG. 5.

Additional embodiments relate to operations at the endpoint policy-management unit 104 and the network-infrastructure policy-management unit 502 in FIGS. 2 and 6. FIG. 9 is a flowchart that shows a method 900 of implementing a network policy for the embodiments of FIG. 1 and FIG. 5. A first block 902 includes receiving context-based values for the mobile device from at least one context-based data source. A second block 904 includes sending the context-based values to a dynamic policy unit that determines network policies related to the mobile device from the context-based values. A third block 906 includes receiving values for a network policy from the dynamic policy unit. A fourth block 908 includes sending instructions to a control unit that enforces the network policy for at least a portion of the communications network. An optional fifth block 910 includes logging events including the context-based values and the network policy values in a storage system. An optional sixth block 912 includes autonomously revising the network policy based on the received context-based values.

The method may further include logging events including the context-based values and the network policy values in a storage system. The method may further include autonomously revising the network policy based on the received context-based values.

The at least one context-based data source may be included in the mobile device, and the control unit may be a mobile device control unit that controls at least some hardware or software of the mobile device.

The at least one context-based data source may be included in network infrastructure that supports operations of the mobile device in the communications network, and the control unit may be a network infrastructure control unit that controls at least some hardware or software of the network infrastructure.

Figure 10:
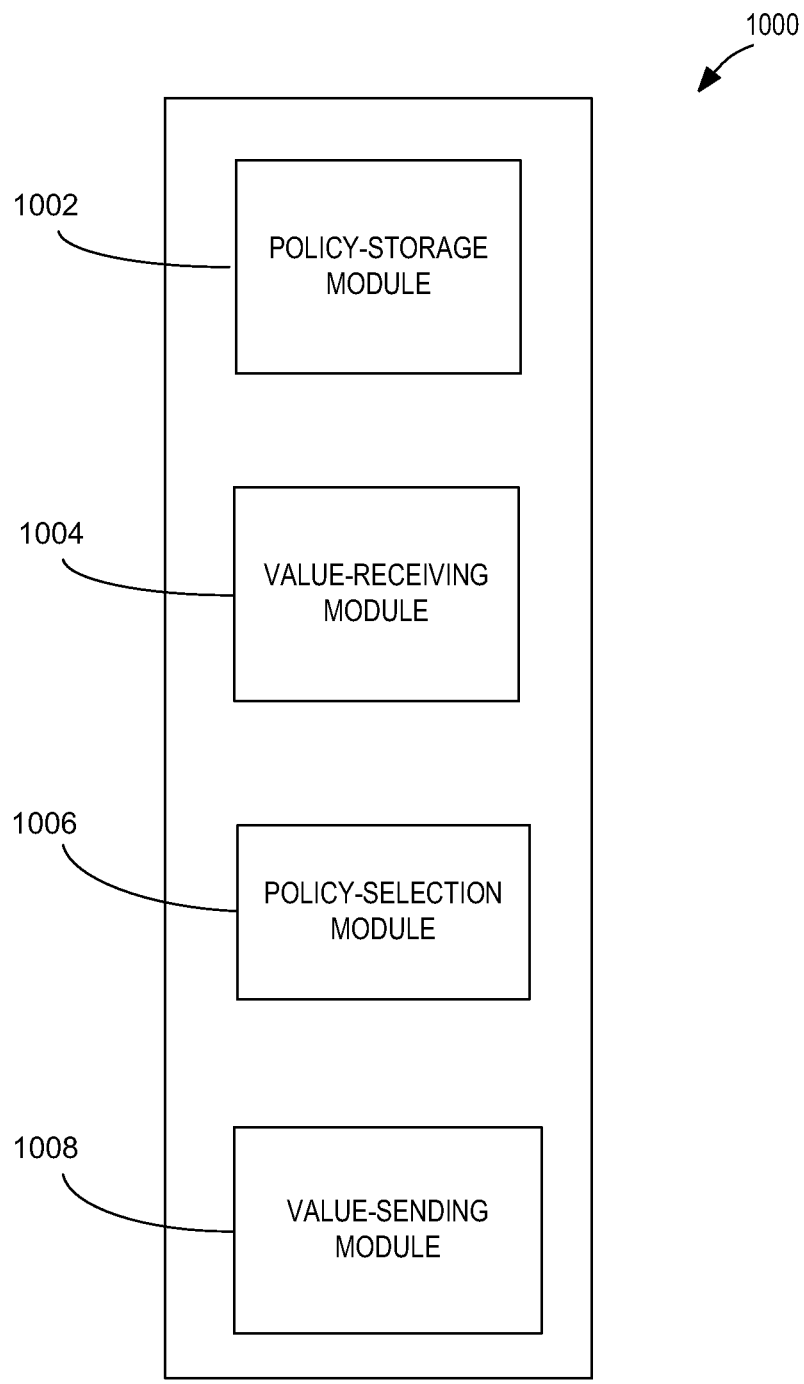
FIG. 10 is a block diagram that shows a schematic representation of an apparatus for an example embodiment.

FIG. 10 shows a schematic representation of an apparatus 1000, in accordance with an example embodiment for selecting a network policy for a mobile device that operates as an endpoint in a communications network. In this case, the apparatus 1000 includes at least one computer system (e.g., as in FIG. 11) to perform software and hardware operations for modules that carry out aspects of the method 400 of FIG. 4 or the method 800 of FIG. 8.

In accordance with an example embodiment, the apparatus 1000 includes a policy-storage module 1002, a value-receiving module 1004, a policy-selection module 1004, a policy-selection module 1004, and a value-sending module 1004.

The policy-storage module 1002 stores network policy values for the mobile device in a storage system, where the network policy values relate context-based values for the mobile device to operational features for the mobile device. The value-receiving module 1004 receives first context-based values for the mobile device from at least one context-based data source. The policy-selection module 1004 uses the first context-based values to select the first network policy for the mobile device from the stored network policy values, where the first network policy specifies first operational features for the mobile device. The value-sending module 1004 sends endpoint values for the first network policy to an endpoint policy management unit to enforce the first network policy at the mobile device.

In the case where the selected network policy affects operations at network infrastructure (e.g., as in FIG. 8), the value-sending module 1004 may also send network-infrastructure values for the first network policy to an network-infrastructure policy-management unit to enforce the first network policy at the mobile device.

Figure 11:
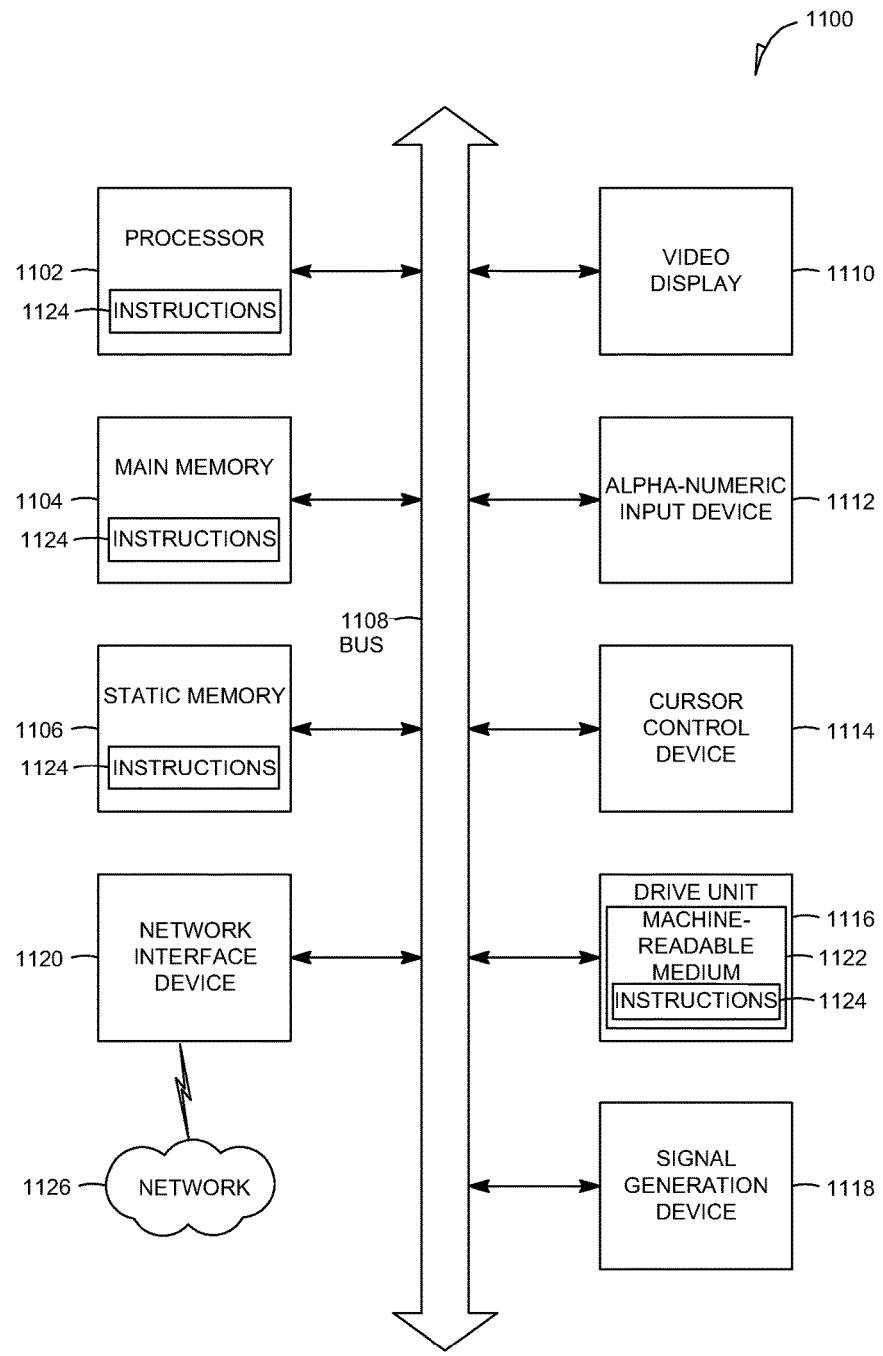
FIG. 11 is a diagram that shows a computer processing system within which a set of instructions for causing the computer to perform any one of the methodologies discussed herein may be executed.

FIG. 11 is a block diagram of machine in the example form of a computer system 1100 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

In some contexts, a computer-readable medium may be described as a machine-readable medium. The disk drive unit 1116 includes a machine-readable medium 1122 on which is stored one or more sets of data structures and instructions 1124 (e.g., software) embodying or utilizing any one or more of the methodologies or functions described herein. The instructions may also reside, completely or at least partially, within the main memory 1104 and/or within the processor 1102 during execution thereof by the computer system 1100, with the main memory 1104 and the processor 1102 also constituting machine-readable media.

While the machine-readable medium 1122 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 1124. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, and optical and magnetic media. Specific examples of machine-readable or computer-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; Compact Disc Read-Only Memory (CD-ROM) and Digital Versatile Disc Read-Only Memory (DVD-ROM).

The instructions 1124 may further be transmitted or received over a communications network 1126 using a transmission medium. The instructions 1124 may be transmitted using the network interface device 1120 and any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of selecting a first network policy for a mobile device that operates as an endpoint in a communications network, the method comprising:
    storing network policy values for a mobile device in a storage system, the network policy values relating context-based values for the mobile device to operational features for managing communications between the mobile device and network infrastructure that supports operations of the mobile device in a communications network in which the mobile device operates as an endpoint, the network infrastructure including at least one server or router that provides access to the communications network for the mobile device;
    receiving first context-based values for the mobile device from at least one context-based data source;
    using the first context-based values to select the first network policy for the mobile device from the stored network policy values, the first network policy specifying first operational features configured to manage the communications between the mobile device and the network infrastructure;
    sending endpoint configuration values for the first network policy to an endpoint policy management unit to control operations of the mobile device; and
    sending network-infrastructure configuration values for the first network policy to a network infrastructure policy management unit to control operations of the network infrastructure, wherein the sent network-infrastructure configuration values control operations of the network infrastructure by at least four of the following:
    enablement of a quality of service setting,
    enablement of a priority setting,
    enablement of a network access control setting,
    enablement of a proxy setting,
    enablement of an authentication requirement,
    enablement of an intrusion detection setting,
    enablement of an intrusion prevention setting,
    enablement of access to a network,
    enablement of access to a servers,
    enablement of access to a directory,
    disablement of a quality of service setting,
    disablement of a priority setting,
    disablement of a network access control setting,
    disablement of a proxy setting,
    disablement of an authentication requirement,
    disablement of an intrusion detection setting,
    disablement of an intrusion prevention setting,
    disablement of access to a network,
    disablement of access to a server, or
    disablement of access to a directory.

2. The method of claim 1, wherein the context-based values for the mobile device include at least one of position or velocity for the mobile device, and the first network policy coordinates operations at the network infrastructure and the mobile device in accordance with the first context-based values to provide the first operational features for managing the communications between the mobile device and the network infrastructure.

3. The method of claim 1, wherein selecting the first network policy includes accessing a dynamic policy function that relates the first context-based values to an enablement or disablement status for one or more hardware or software elements at the mobile device.

4. The method of claim 1, wherein the endpoint policy management unit sends instructions corresponding to the first network policy to a mobile-device control unit that controls software and hardware operations at the mobile device, the endpoint policy management unit being external to the mobile device, and the mobile-device control unit being included in the mobile device.

5. The method of claim 1, wherein the context-based values for the mobile device include at least one performance characteristic for the communications between the mobile device and the network infrastructure.

6. The method of claim 1, wherein the operational features for managing the communications between the mobile device and the network infrastructure include at least one enabled function or disabled function within the mobile device or within the network infrastructure.

7. The method of claim 1, wherein the at least one context-based data source includes at least one performance measurement device within the mobile device or the network infrastructure, the performance measurement device characterizing a quality of the communications between the mobile device and the network infrastructure.

8. The method of claim 1, wherein the first operational features for managing the communications between the mobile device and the network infrastructure include an enablement or disablement of at least one function of the at least one server or router included in the network infrastructure.

9. An apparatus configured to select a first network policy for a mobile device that operates as an endpoint in a communications network, the apparatus comprising at least one computer configured to instantiate computer-implemented modules including:
    a policy-storage module that is configured to store network policy values for a mobile device in a storage system, the network policy values relating context-based values for the mobile device to operational features for managing communications between the mobile device and network infrastructure that supports operations of the mobile device in a communications network, the network infrastructure including at least one server or router that provides access to the communications network for the mobile device;
    a value-receiving module that is configured to receive first context-based values for the mobile device from at least one context-based data source;
    a policy-selection module that is configured to use the first context-based values to select the first network policy for the mobile device from the stored network policy values, the first network policy specifying first operational features configured to manage the communications between the mobile device and the network infrastructure;
    a first value-sending module configured to send endpoint configuration values for the first network policy to an endpoint policy management unit to control operations of the mobile device; and
    a second value-sending module configured to send network-infrastructure configuration values for the first network policy to a network infrastructure policy management unit to control operations of the network infrastructure, wherein the sent network-infrastructure configuration values control operations of the network infrastructure by at least four of the following:
enablement of a quality of service setting,
enablement of a priority setting,
enablement of a network access control setting,
enablement of a proxy setting,
enablement of an authentication requirement,
enablement of an intrusion detection setting,
enablement of an intrusion prevention setting,
enablement of access to a network,
enablement of access to a servers,
enablement of access to a directory,
disablement of a quality of service setting,
disablement of a priority setting,
disablement of a network access control setting,
disablement of a proxy setting,
disablement of an authentication requirement,
disablement of an intrusion detection setting,
disablement of an intrusion prevention setting,
disablement of access to a network,
disablement of access to a server, or
disablement of access to a directory.

10. The apparatus of claim 9, wherein the context-based values for the mobile device include at least one of position or velocity for the mobile device, and the first network policy coordinates operations at the network infrastructure and the mobile device in accordance with the first context-based values to provide the first operational features for managing the communications between the mobile device and the network infrastructure.

11. The apparatus of claim 9, wherein selecting the first network policy includes accessing a dynamic policy function that relates the first context-based values to an enablement or disablement status for one or more hardware or software elements at the mobile device.

12. The apparatus of claim 9, wherein the context-based values for the mobile device include at least one performance characteristic for the communications between the mobile device and the network infrastructure.

13. The apparatus of claim 9, wherein the operational features for managing the communications between the mobile device and the network infrastructure include at least one enabled function or disabled function within the mobile device or within the network infrastructure.

14. The apparatus of claim 9, wherein the at least one context-based data source includes at least one performance measurement device within the mobile device or the network infrastructure, the performance measurement device characterizing a quality of the communications between the mobile device and the network infrastructure.

15. The apparatus of claim 9, wherein the first operational features for managing the communications between the mobile device and the network infrastructure include an enablement or disablement of at least one function of the at least one server or router included in the network infrastructure.

16. A non-transitory computer-readable medium that stores one or more computer programs that, when executed by one or more processors, effectuate operations comprising:
storing network policy values for a mobile device in a storage system, the network policy values relating context-based values for the mobile device to operational features for managing communications between the mobile device and network infrastructure that supports operations of the mobile device in a communications network, the network infrastructure including at least one server or router that provides access to the communications network for the mobile device;
receiving first context-based values for the mobile device from at least one context-based data source;
using the first context-based values to select the first network policy for the mobile device from the stored network policy values, the first network policy specifying first operational features for managing the communications between the mobile device and the network infrastructure;
sending endpoint configuration values for the first network policy to an endpoint policy management unit to control operations of the mobile device; and
sending network-infrastructure configuration values for the first network policy to a network infrastructure policy management unit to control operations of the network infrastructure, wherein the sent network-infrastructure configuration values control operations of the network infrastructure by at least four of the following:
enablement of a quality of service setting,
enablement of a priority setting,
enablement of a network access control setting,
enablement of a proxy setting,
enablement of an authentication requirement,
enablement of an intrusion detection setting,
enablement of an intrusion prevention setting,
enablement of access to a network,
enablement of access to a servers,
enablement of access to a directory,
disablement of a quality of service setting,
disablement of a priority setting,
disablement of a network access control setting,
disablement of a proxy setting,
disablement of an authentication requirement,
disablement of an intrusion detection setting,
disablement of an intrusion prevention setting,
disablement of access to a network,
disablement of access to a server, or
disablement of access to a directory.

17. A method of implementing a network policy for a mobile device that operates as an endpoint in a communications network, the method comprising:
receiving context-based values for a mobile device from at least one context-based data source;
sending the context-based values to a dynamic policy unit that determines network policies related to the mobile device from the context-based values, the network policies relating the context-based values for the mobile device to operational features for managing communications between the mobile device and network infrastructure that supports operations of the mobile device in a communications network, the network infrastructure including at least one server or router that provides access to the communications network for the mobile device;
receiving values for a network policy from the dynamic policy unit, the network policy specifying the operational features for managing the communications between the mobile device and the network infrastructure;
sending instructions to a control unit that enforces the network policy for at least a portion of the communications network, the control unit including a network-infrastructure control unit that controls operations of the network infrastructure by controlling at least some hardware or software of the at least one server or router included in the network infrastructure, wherein controlling operations of the network infrastructure comprises controlling operations of the network infrastructure by at least four of the following:
enablement of a quality of service setting,
enablement of a priority setting,
enablement of a network access control setting,
enablement of a proxy setting,
enablement of an authentication requirement,
enablement of an intrusion detection setting,
enablement of an intrusion prevention setting,
enablement of access to a network,
enablement of access to a servers,
enablement of access to a directory,
disablement of a quality of service setting,
disablement of a priority setting,
disablement of a network access control setting,
disablement of a proxy setting,
disablement of an authentication requirement,
disablement of an intrusion detection setting,
disablement of an intrusion prevention setting,
disablement of access to a network,
disablement of access to a server, or
disablement of access to a directory.

18. The method of claim 17, further comprising:
logging events including the context-based values and the network policy values in a storage system.

19. The method of claim 17, further comprising:
autonomously revising the network policy based on the received context-based values, the received context-based values including environmental factors related to network usage.

20. The method of claim 17, wherein
the at least one context-based data source is included in the mobile device, and
the control unit includes a mobile-device control unit that controls at least some hardware or software of the mobile device.

21. The method of claim 17, wherein the at least one context-based data source is included in the network infrastructure, the context-based data source being external to the mobile device.

22. An apparatus for implementing a network policy for a mobile device that operates as an endpoint in a communications network, the apparatus comprising at least one computer to perform operations for computer-implemented modules including:
a data-retrieval module configured to receive context-based values for the mobile device from at least one context-based data source and sends the context-based values to a dynamic policy unit that determines network policies related to the mobile device from the context-based values, the network policies relating the context-based values for the mobile device to operational features for managing communications between the mobile device and network infrastructure that supports operations of the mobile device in the communications network, the network infrastructure including at least one server or router that provides access to the communications network for the mobile device;
a dynamic-policy-enforcement module configured to receive values for a network policy from the dynamic policy unit and sends instructions to a control unit that enforces the network policy for at least a portion of the communications network, the control unit including a network-infrastructure control unit that controls operations of the network infrastructure by controlling at least some hardware or software of the at least one server or router included in the network infrastructure, wherein controlling operations of the network infrastructure comprises controlling operations of the network infrastructure by at least four of the following:
enablement of a quality of service setting,
enablement of a priority setting,
enablement of a network access control setting,
enablement of a proxy setting,
enablement of an authentication requirement,
enablement of an intrusion detection setting,
enablement of an intrusion prevention setting,
enablement of access to a network,
enablement of access to a servers,
enablement of access to a directory,
disablement of a quality of service setting,
disablement of a priority setting,
disablement of a network access control setting,
disablement of a proxy setting,
disablement of an authentication requirement,
disablement of an intrusion detection setting,
disablement of an intrusion prevention setting,
disablement of access to a network,
disablement of access to a server, or
disablement of access to a directory.

23. The apparatus of claim 22, further comprising:
an event-logging module that logs events including the context-based values and the network policy values in a storage system.

24. The apparatus of claim 22, further comprising:
an autonomous-configuration module that autonomously revises the network policy based on the received context-based values, the received context-based values including environmental factors related to network usage.

25. The apparatus of claim 22, wherein
the at least one context-based data source is included in the mobile device, and
the control unit includes a mobile-device control unit that controls at least some hardware or software of the mobile device.

26. The apparatus of claim 22, wherein the at least one context-based data source is included in the network infrastructure, the context-based data source being external to the mobile device.

27. A non-transitory computer-readable medium that stores a computer program including instructions that, when executed by a computer, cause the computer to perform operations comprising:
receiving, with one or more processors, context-based values for a mobile device from at least one context-based data source;
sending, with one or more processors, the context-based values to a dynamic policy unit that determines network policies related to the mobile device from the context-based values, the network policies relating the context-based values for the mobile device to operational features for managing communications between the mobile device and network infrastructure that supports operations of the mobile device in a communications network, the network infrastructure including at least one server or router that provides access to the communications network for the mobile device;
receiving, with one or more processors, values for a network policy from the dynamic policy unit, the network policy specifying the operational features configured to manage the communications between the mobile device and the network infrastructure;

sending, with one or more processors, instructions to a control unit that enforces the network policy for at least a portion of the communications network, the control unit including a network-infrastructure control unit that controls operations of the network infrastructure by controlling at least some hardware or software of the at least one server or router included in the network infrastructure, wherein controlling operations of the network infrastructure comprises controlling operations of the network infrastructure by at least four of the following:

enablement of a quality of service setting,
enablement of a priority setting,
enablement of a network access control setting,
enablement of a proxy setting,
enablement of an authentication requirement,
enablement of an intrusion detection setting,
enablement of an intrusion prevention setting,
enablement of access to a network,
enablement of access to a servers,
enablement of access to a directory,
disablement of a quality of service setting,
disablement of a priority setting,
disablement of a network access control setting,
disablement of a proxy setting,
disablement of an authentication requirement,
disablement of an intrusion detection setting,
disablement of an intrusion prevention setting,
disablement of access to a network,
disablement of access to a server, or
disablement of access to a directory.

28. The method of claim 1 wherein:
the context-based values are received at a dynamic-policy unit that is external to the mobile device;
the endpoint configuration values for the first network policy are sent from the dynamic-policy unit to the endpoint policy management unit; and
the network-infrastructure configuration values for the first network policy are sent from the dynamic-policy unit to the network infrastructure policy management unit.

29. The method of claim 1 wherein the first network policy includes at least one parameter that specifies a quality or priority for the communications between the mobile device and the network infrastructure.

30. The method of claim 1, wherein the first context-based values include environmental factors comprising network traffic.

31. The method of claim 1, wherein the first operational features for managing the communications between the mobile device and the network infrastructure comprise:
a policy setting that assigns a quality of service or priority on the communications network to the mobile device.

32. The method of claim 1, wherein the first operational features for managing the communications between the mobile device and the network infrastructure comprise:
a policy setting that assigns a network access control setting to the mobile device.

33. The method of claim 1, wherein the first operational features for managing the communications between the mobile device and the network infrastructure comprise:
a policy setting that assigns a proxy setting to the mobile device.

34. The method of claim 1, wherein the first operational features for managing the communications between the mobile device and the network infrastructure comprise:
a policy setting that assigns an authentication requirement to the mobile device.

35. The method of claim 1, wherein the first operational features for managing the communications between the mobile device and the network infrastructure comprise:
a policy setting that assigns an intrusion detection setting to the mobile device.

36. The method of claim 1, wherein receiving the first context-based values comprises receiving the first context-based values for the mobile device and the network infrastructure from a plurality of context-based data sources, and wherein the plurality of context-based data sources include sensors at the mobile device and the network infrastructure.

37. The method of claim 1, wherein the sent network-infrastructure configuration values control operations of the network infrastructure by at least eight of the following:
enablement of a quality of service setting,
enablement of a priority setting,
enablement of a network access control setting,
enablement of a proxy setting,
enablement of an authentication requirement,
enablement of an intrusion detection setting,
enablement of an intrusion prevention setting,
enablement of access to a network,
enablement of access to a servers,
enablement of access to a directory,
disablement of a quality of service setting,
disablement of a priority setting,
disablement of a network access control setting,
disablement of a proxy setting,
disablement of an authentication requirement,
disablement of an intrusion detection setting,
disablement of an intrusion prevention setting,
disablement of access to a network,
disablement of access to a server, or
disablement of access to a directory.

38. The method of claim 1, wherein the sent network-infrastructure configuration values control operations of the network infrastructure by the following:
enablement of a quality of service setting,
enablement of a priority setting,
enablement of a network access control setting,
enablement of a proxy setting,
enablement of an authentication requirement,
enablement of an intrusion detection setting,
enablement of an intrusion prevention setting,
enablement of access to a network,
enablement of access to a servers,
enablement of access to a directory,
disablement of a quality of service setting,
disablement of a priority setting,
disablement of a network access control setting,
disablement of a proxy setting,
disablement of an authentication requirement,
disablement of an intrusion detection setting,
disablement of an intrusion prevention setting,
disablement of access to a network,
disablement of access to a server, and
disablement of access to a directory.

* * * * *